United States Patent [19]

Fisk

[11] Patent Number: 4,493,908

[45] Date of Patent: Jan. 15, 1985

[54] STABLE DISPERSIONS OF POLYMERS IN POLYFUNCTIONAL COMPOUNDS HAVING A PLURALITY OF ACTIVE HYDROGENS

[75] Inventor: Thomas E. Fisk, Midland, Mich.

[73] Assignee: The Dow Chemical Company, Midland, Mich.

[21] Appl. No.: 581,405

[22] Filed: Feb. 17, 1984

Related U.S. Application Data

[63] Continuation-in-part of Ser. No. 467,409, Feb. 17, 1983.

[51] Int. Cl.$^3$ .................... C08G 18/10; C08L 75/00
[52] U.S. Cl. .................................... 521/137; 528/75; 252/182
[58] Field of Search ............... 528/75; 521/137; 252/182

[56] References Cited

U.S. PATENT DOCUMENTS

| | | | |
|---|---|---|---|
| Re. 24,514 | 8/1958 | Hoppe et al. | 521/172 |
| 2,846,408 | 8/1958 | Brachhagen et al. | 521/124 |
| 3,215,652 | 11/1965 | Kaplan | 521/160 |
| 3,304,273 | 2/1967 | Stamberger | 521/88 |
| 3,383,351 | 5/1968 | Stamberger | 524/762 |
| 3,523,093 | 8/1970 | Stamberger | 521/88 |
| 3,652,639 | 3/1972 | Pizzini et al. | 260/465.4 |
| 3,755,212 | 8/1973 | Dunlap et al. | 521/174 |
| 3,821,130 | 6/1974 | Barron et al. | 521/133 |
| 3,823,201 | 7/1974 | Pizzini et al. | 524/762 |
| 3,849,156 | 11/1974 | Marlin et al. | 428/85 |
| 4,148,840 | 4/1979 | Shah | 521/137 |
| 4,390,645 | 6/1983 | Hoffman et al. | 521/137 |

OTHER PUBLICATIONS

Journal of the American Chemical Society, vol. 49, p. 3181 (1927).

*Primary Examiner*—John Kight
*Assistant Examiner*—M. L. Moore

[57] ABSTRACT

A stable copolymer dispersion is prepared by addition copolymerization of (1) a monomeric adduct of an active hydrogen compound, e.g., a polyether polyol or polyether monool, and an ethylenically unsaturated chloroglyoxylyl compound such as acryloxyethyl chloroglyoxalate with (2) ethylenically unsaturated monomer(s), e.g., styrene or a mixture thereof with acrylonitrile, while (1) and (2) are dispersed or dissolved in an excess of an active hydrogen polyfunctional compound such as a polyether polyol. The molar ratio of chloroglyoxylyl moiety to active hydrogen compound is preferably less than about 0.1:1. The resulting dispersion has a controlled particle size and a viscosity such that it is suitably employed in the production of polyurethane foams.

15 Claims, No Drawings

STABLE DISPERSIONS OF POLYMERS IN POLYFUNCTIONAL COMPOUNDS HAVING A PLURALITY OF ACTIVE HYDROGENS

REFERENCE TO RELATED APPLICATION

This application is a continuation-in-part of copending U.S. patent application Ser. No. 467,409, filed Feb. 17, 1983.

BACKGROUND OF THE INVENTION

The present invention relates to copolymer dispersions having excellent particle size distribution and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties such as load bearing and processability, particularly foam applications, unacceptable for some applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, more efficient control of particle size of the disperse phase is desired for many applications.

Accordingly, it is highly desirable to provide an improved, low viscosity copolymer dispersion wherein less unsaturated moiety is required in the polyahl in order to achieve the desired particle size and particle size distribution in the dispersion.

SUMMARY OF THE INVENTION

In one aspect, the present invention is an ethylenically unsaturated haloglyoxylyl monomer which is the reaction product of an ethylenically unsaturated compound having at least one active hydrogen moiety and an oxalyl halide.

In another aspect, the present invention is a stable improved copolymer dispersion which comprises:
(A) a polyahl having dispersed therein;
(B) an addition copolymerizate of (1) a monomeric adduct of (a) an active ethylenically unsaturated haloglyoxylyl monomer (hereinafter called "haloglyoxylyl monomer") and (b) a monoahl or a polyahl with (2) at least one other ethylenically unsaturated monomer (hereinafter called "other monomer"); or
(C) a polymeric adduct of (1) an addition copolymer of a haloglyoxylyl monomer with at least one other ethylenically unsaturated monomer and (2) a monoahl or polyahl; or
(D) a mixture of (B) and (C); or
(E) a mixture of (B) and/or (C) and a polymer of at least one other ethylenically unsaturated monomer.

Preferably, the mole ratio of polymerized haloglyoxylyl monomer to monoahl or polyahl is at least about 0.001:1 and is less than an amount at which gelation occurs. For the purposes of this invention, a "monoahl" is a polyfunctional compound wherein one of the functional groups is an active hydrogen moiety capable of reacting with an isocyanate moiety to form a urethane or similar moiety. For the purposes of this invention, a "polyahl" is a polyfunctional compound wherein at least two of the functional groups are active hydrogen moieties capable of reacting with an isocyanate moiety to form a urethane or similar moiety. In addition, the terms "dispersed" or "dispersion" as used herein are generic to include dispersions wherein the disperse phase constitutes colloidal size particles as well as true solutions wherein the disperse phase is at the molecular level.

Surprisingly, the copolymer dispersions of the present invention exhibit excellent stability even at relatively low molar ratios of ethylenically unsaturated moieties to polyahl. Even more surprising is the excellent control over particle size and particle size distribution achieved in said dispersions.

This invention, in another aspect, is a method for making the aforementioned copolymer dispersion. In yet another aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed in the practice of this invention includes any organic compound having at least two active hydrogen moieties wherein the compound has a number average molecular weight ($M_n$) of at least 60. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of the American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids. Of the foregoing polyahls, the polyols are preferred. Examples of representative polyahls which are suitably employed in the practice of this invention are disclosed in U.S. Pat. No. 4,390,645, which is incorporated herein by reference.

Examples of suitable monoahls include monohydric polyethers and monohydric polyesters which are similar in all respects to such polyols as defined hereinbefore except that monofunctional initiators such as monohydric alcohols are used as polymerization initiators instead of the polyfunctional initiators used to initiate polyol polyethers and polyol polyesters. Exemplary monohydric initiators include methanol, ethanol, butanol, and monohydric glycol ethers such as tripropylene glycol methyl ether, as well as phenols, acids, mercaptans, and the like. Other suitable monoahls include monohydroxyl epoxy resins, monohydroxyl polyurethane polymers, monohydroxyl phosphorus compounds, alkylene oxide adducts of monohydric thioesters including polythioethers, monohydric acetals including polyacetals, as well as monomercaptans, N-methylol amides, monoamines, and other compounds which are similar to the aforementioned polyahls except that they contain only one active hydrogen moiety. Of the foregoing monoahls, the monohydric polyethers are preferred.

For the purposes of this invention, the term "active ethylenically unsaturated haloglyoxylyl" or "haloglyoxylyl monomer" means a monomer having a haloglyoxylyl group and an ethylenically unsaturated group capable of undergoing free radical initiated addition polymerization as readily as an α,β-ethylenically unsaturated haloglyoxylyl, preferably as readily as acryloyl.

Representative haloglyoxylyl monomers included in the present invention are most advantageously represented by the formula:

$$\begin{array}{c} X \\ | \\ X-CH=C-(X')-X''-\overset{O}{\overset{\|}{C}}\overset{O}{\overset{\|}{C}}Cl \end{array}$$

wherein each X is individually hydrogen, lower alkyl, halo-substituted alkyl, aryl, and the like; and X' is a suitable connecting fragment such as alkylene or aryl fragments as, for example, those represented by the formulas:

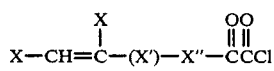

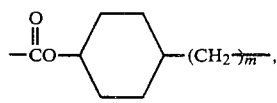

wherein m is a whole number preferably from about 1 to about 6; and the like. Alternatively, X' can be absent. X" is —O—, —S—, =N—,

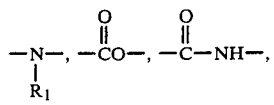

or the like, wherein $R_1$ is hydrogen or alkyl; preferably X" is —O—. The terminology "each X is individually" means that the X groups in a particular monomer molecule can be the same or different.

The haloglyoxylyl monomer of this invention is prepared by slowly adding an ethylenically unsaturated compound having at least one active hydrogen moiety, which moieties have been described hereinbefore, to an oxalyl chloride. It is most preferred to employ oxalyl chloride due to considerations such as commercial availability, however, it is understood that other oxalyl halides such as oxalyl fluoride and oxalyl bromide can also be employed, and the use of these compounds is deemed to be within the scope of this invention. Advantageously, the reaction mixture is cooled during the time the reactants are mixed. The resulting product can be distilled, preferably under vacuum in order to further purify the product. The mole ratio of oxalyl halide to active hydrogen moiety can range from about 1:1 to a large excess of oxalyl chloride, with a mole ratio of about 2:1 being most preferred. The ethylenically unsaturated compound containing active hydrogen moiety used herein can vary. While virtually any vinyl functional active hydrogen moiety can be employed herein, the ethylenically unsaturated alcohols are preferred with the hydroxyalkyl acrylates, hydroxyalkyl methacrylates, and hydroxyaryl acrylates most preferred. Vinyl functional diols can also be employed.

The haloglyoxylyl monomers of the present invention exhibit an enhanced thermal stability. This enhanced stability allows reaction of the haloglyoxylyl function at elevated temperatures without loss of the glyoxylyl group. This enhanced thermal stability is desirable in situations where the thermal decomposition of the reactive portions of the monomer would compete with the reaction that links the monoahl or polyahl to the unsaturated haloglyoxylyl.

The adduct of monoahl or polyahl and haloglyoxylyl monomer is the reaction product resulting from the reaction of an active hydrogen moiety of a monoahl or polyahl with the haloglyoxylyl moiety of an active ethylenically unsaturated haloglyoxylyl moiety. The adduct is advantageously compatible with the polyahl which is the continuous phase of the copolymer dispersion. By "compatible with" it is meant that the adduct is either soluble in or dispersible in the polyahl. Typically, the adduct has a polymer backbone corresponding to the polymer backbone of the monoahl or polyahl and at least one pendant ethylenically unsaturated group. When the monoahl is a monool or the polyahl is a polyol, the linkage is represented by the formula:

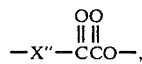

wherein X is as defined previously. When the monoahl is a monoamine or the polyahl is polyamine, the linkage is represented by the formula:

The more preferred adducts employed in the present invention are those represented by the formula:

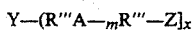

wherein each A is individually —O—, —S— or

wherein $R_1$ is hydrogen or alkyl, preferably A is —O—; Y is hydroxyl, oxyhydrocarbyl, oxycarbonylhydrocarbyl, an α, β-ethylenically unsaturated moiety linked to the remaining portion of said adduct by an oxoglyoxylyl, or a residue of an active hydrogen initiator suitably employed in preparation of a polyether; each Z is individually hydroxyl, oxyhydrocarbyl, oxycarbonylhydrocarbyl or said α, β-ethylenically unsaturated moiety provided that the polyether contains at least one of said α, β-ethylenically unsaturated moieties; each R''' is individually alkylene, hydroxyalkylene, aminoalkylene, alkoxyalkylene, aryloxyalkylene, arylalkylene, hydroxyalkylalkylene, hydroxyarylalkylene, or haloalkylene; m is a whole number such that —(R'''A)$_m$—R'''— has a number average molecular weight ($M_n$) from about 100 to about 100,000, especially from about 250 to about 10,000; and x is a whole number from 1 to 10 provided that when Y is other than hydroxyl, x is at least 2. Most preferably, x is 2 or 3. For the purposes of this invention, hydrocarbyl is a monovalent hydrocarbon moiety such as aryl, alkyl, alkenyl and the like. Also, the terminology "each R''' is individually" means that the R''' groups in a particular polymer molecule may be the same or different. A corresponding interpretation applies to the terminologies "each Z is individually" and "each A is individually."

The most preferred adducts have polyalkyleneoxy backbones bearing at least one pendant ethylenically unsaturated oxalate group and are represented by the formula:

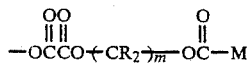

wherein each R is individually hydrogen, alkyl or a comparable inert substituent; M is an ethylenically unsaturated moiety such as

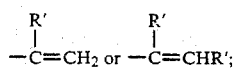

each R' is individually hydrogen, lower alkyl of, for example, about one to about four carbon atoms or

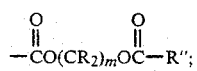

with R'' being an inert group such as alkoxy or polyalkyleneoxy; and m is a whole number preferably 1 to 6, more preferably 2 to 4, and most preferably 2.

Alternatively, portions of other adducts can be represented by the formulas:

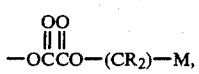

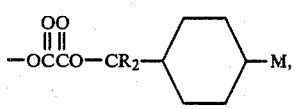

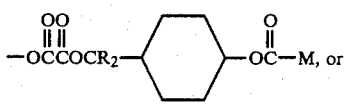

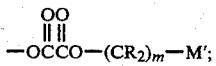

wherein M, R and m are as previously defined, and M' is an acetylenic moiety such as

wherein R' is as previously defined. Vinyl functional bishaloglyoxalates can also be employed, but are much less preferred. It is understood that much preferred adducts as previously described are prepared from the correspondingly novel haloglyoxalate monomers.

The adduct of haloglyoxylyl monomer and monoahl or polyahl (hereinafter called "mono-adduct") is most advantageously prepared by reacting an active ethylenically unsaturated haloglyoxylyl monomer with a monoahl or polyahl under conditions sufficient to cause the haloglyoxalate portion of the monomer to react with an active hydrogen group of the monoahl or polyahl to form a glyoxalate-type linkage. That is, for example, the method of preparing the copolymer dispersions of this invention comprises reacting an active haloglyoxylyl monomer with a monoahl or polyahl to form a monomeric adduct and copolymerizing the adduct with another ethylenically unsaturated monomer or a mixture of at least two of such other monomers in a polyahl liquid medium which medium is a continuous phase.

Advantageously, when the monoahl is a monool or the polyahl is a polyol the reaction is carried out in the presence of an amine such as triethylamine, pyridine or N,N-dimethylaniline. The conditions employed in carrying out the adduct formation involve maintaining the reaction mixture of the monoahl or polyahl and haloglyoxylyl monomer either neat, or alternatively dissolved in a non-reactive solvent such as methylene chloride, ethyl acetate, toluene or diethyl ether at a temperature from ambient to reflux in a vessel for a reaction time from a few seconds to about 24 hours. Also suitably employed are reactive solvents such as polyahl or other ethylenically unsaturated monomers. The equivalent ratio of haloglyoxylyl monomer to active hydrogen of the polyahl is less than one in order that gelation not occur. In the more preferred embodiments, very low haloglyoxylyl to active equivalent hydrogen ratios are employed, e.g., less than about 0.2:1, preferably in the range from about 0.2:1 to about 0.001:1, most preferably in the range from about 0.1:1 to about 0.001:1. It is understood that in the case of a monoahl, the haloglyoxylyl to active equivalent hydrogen ratio can be significantly higher than the case of the polyahl. If a solvent has been used in the reaction, it can be removed, or the composition containing the solvent can be employed as is. Also, the mono-adduct can be blended with additional polyahl.

Another method of preparing the copolymer dispersions of this invention comprises copolymerizing an active haloglyoxylyl monomer with another ethylenically unsaturated monomer or a mixture of at least two of such other monomers, and reacting the resulting copolymer with a monoahl or polyahl in excess polyahl to form a polymeric adduct of monoahl or polyahl and copolymer dispersed in polyahl. The adduct of (1) addition copolymer of haloglyoxylyl monomer with at least one other ethylenically unsaturated monomer and (2) a monoahl or a polyahl (hereinafter called "polyadduct") is beneficially prepared by first copolymerizing the haloglyoxylyl monomer with other monomer(s) by polymerization techniques described hereinafter and then reacting the copolymer with a monoahl or a polyahl using the procedures and conditions described hereinbefore to react the haloglyoxylyl monomer with the monoahl or polyahl.

The mixture of poly-adduct and copolymerizate of mono-adduct and other monomer(s) is readily prepared by physically mixing the components neat or dispersed in polyahl. Alternatively, this mixture can be prepared by subjecting a mixture of monoahl or polyahl, haloglyoxylyl monomer and other monomer(s) to conditions sufficient to cause copolymerization and isocyanate/polyahl reaction. The polyahl dispersion containing a mixture of the poly-adduct and/or the copolymerizate with a polymer(s) of other monomer(s) is advantageously made by forming a dispersion of poly-adduct and/or copolymerizate in polyahl by one of the foregoing methods and then adding other monomer(s) and subjecting the resulting formulation to polymerization conditions. It is found that the poly-adduct and/or copolymerizate stabilize the resulting dispersion of polymer much in the same manner as described in U.S. Pat. No. 4,148,840.

Suitable ethylenically unsaturated monomers (so-called other monomers or other ethylenically unsaturated monomers), which are copolymerized to form copolymers with the monomeric adduct and/or the reactive monomer, include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene and ar-bromostyrene; α, β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; αβ-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned monomeric adduct or reactive monomer, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of other ethylenically unsaturated monomer(s) employed in the copolymerization reaction is generally an amount sufficient to provide good reinforcement in polyurethane polymers and cell opening in polyurethane foams. Preferably, the amount of other unsaturated monomer(s) is from about 1 to about 70, more preferably from about 5 to about 50, most preferably from about 10 to about 40, weight percent based on the weight of the copolymer dispersion. The amount of the mono-adduct employed in the copolymerization reaction is an amount sufficient to produce a stable dispersion and provide particle size control. Preferably, the amount of the mono-monomeric adduct employed is in the range from about 0.01 to about 50, more preferably from about 0.05 to about 25, most preferably from about 0.1 to about 15, weight percent based on the weight of the copolymer dispersion.

The copolymerization is readily carried out by simultaneously adding at a steady or constant rate monomer(s) and a free radical catalyst to the unsaturated monoahl or unsaturated polyahl or a mixture of the unsaturated monoahl or polyahl and the polyahl under conditions sufficient to cause free radical addition polymerization. The temperature of the copolymerization is dependent upon the initiator and is preferably in the range of from about 25° to about 190° C., most preferably from about 110° to about 130° C., when azo-type catalysts are used. Alternatively, the free radical catalyst may be dispersed in a portion of the polyahl and thereafter added along with monomer to the unsaturated monoahl or unsaturated polyahl. Other polymerization processes, both continuous and batch, may be suitably employed.

Suitably, the concentration of polymerization catalyst is any amount sufficient to cause copolymerization of the monomeric adduct and the ethylenically unsaturated monomer(s). Preferably, however, the concentration of catalyst is in the range from about 0.1 to about 20, more preferably from about 0.5 to about 5, weight percent based on the weight of the other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) and peroxy esters such as t-butyl peroctoate and t-butyl perbenzoate are preferred.

In addition to the foregoing catalysts, chain transfer agents such as mercaptans, e.g., dodecanethiol, and carbon tetrahalides such as carbon tetrachloride may be employed in conventional amounts of control molecular weight of the copolymerizate.

An especially preferred dispersion is one wherein the polyahl is a polyether polyol, the monoahl is a polyether monool, the reactive chloroglyoxalate monomer is methacryloxyethylchloroglyoxalate or acryloxyethylchloroglyoxalate and the other ethylenically unsaturated monomer or a mixture of at least two of such other monomers is a monovinylidene aromatic, an ethylenically unsaturated carboxylic acid, an ethylenically unsaturated nitrile, an alkyl ester of an ethylenically unsaturated carboxylic acid, a vinyl halide, a vinylidene halide or a mixture of two or more thereof.

The resulting copolymer dispersion is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5l-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4', 4'-triphenylmethane triisocyanate, polymethylene polyphenylisocyanate and tolylene-2,4,6-triisocyanate; and the tetraisocyanates such as 4,4'-dimethyldiphenylmethane-2,2', 5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)-ethylenediamine.

The urethane reaction of polyisocyanate with the copolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N', N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acide sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

The methacryloxyethyl chloroglyoxalate is prepared as follows. Into a 250-ml, 3-neck, round-bottom flask equipped with stirring device, thermocouple, pressure equilizing addition funnel under a blanket of nitrogen is charged 25.4 g (0.2 mole) oxalyl chloride. The flask is immersed in an ice/water bath with stirring. After equilibration to 2°–3° C., 13 g (0.1 mole) of 2-hydroxyethyl methacrylate is added dropwise over a 20-minute period. The mixture is allowed to warm to room temperature and stirred overnight. Distillation through a short path column gives a water-white liquid, although a significant amount of polymerization occurs during distillation.

EXAMPLE 2

A mono-adduct is prepared as follows. Into a 500-ml, 3-neck, round-bottom flask equipped as described in Example 1 is charged 55.5 g (0.44 mole) oxalyl chloride and cooled as described above. To this is added 26 g (0.21 mole) 2-hydroxyethylmethyl methacrylate over a 45-minute period. The mixture is allowed to warm to ambient temperature followed by the application of a 15 mm vacuum for one-half hour.

Into a similar apparatus as described above is added 100 g (0.035 mole) of a butanol initiated polyalkylene glycol monool made from propylene oxide and butanol, 200 ml of dichloromethane, and 3.9 g (0.038 mole) of triethylamine. The solution is stirred and heated to reflux at which time 8.4 g (0.38 mole) of the chloroglyoxalate prepared above diluted in 25 ml of dichloromethane is added to the flask over a 1-hour period. After addition, the reaction contents are cooled, filtered and the dichloromethane stripped by distillation. The residual product is cooled and 200 ml of anhydrous ethyl ether is added. The precipitate is filtered and the ether is removed by vacuum distillation to produce a clear, yellow oil.

EXAMPLE 3

A polystyrene dispersion is polyether polyol is prepared as follows. Into a 2-liter, 3-neck, round-bottom flask fitted with a reflux condenser, mechanical stirrer, thermometer, and addition funnel is charged 510 g (0.1 mole) of a glycerine initiated polyalkylene polyol made from propylene oxide and ethylene oxide and 35.2 g (0.01 mole) of the mono-adduct prepared in Example 2. The mixture is stirred and heated to 120° C. and a solution of 2.7 g of azobisisobutyronitrile (AZO) dissolved in 134 g (1.29 moles) of styrene is added over a 90-minute period. The contents are stripped at 15 mm for 2 hours at 120° C. to yield a stable copolymer/polyol dispersion having a Brookfield viscosity (RV viscometer, spindle No. 3, 10 rpm at 25° C.) of 1900.

EXAMPLE 4

A polystyrene dispersion in polyether polyol is prepared as follows. Into the apparatus as described in Example 3 is charged 510 g of polyol and 1.50 g (0.005 mole) of the mono-adduct prepared in Example 2. The mixture is stirred and heated to 140° C. for one-half hour, cooled to 120° C., and a solution of 2.7 g of AZO dissolved in 128 g (1.28 moles) of styrene is added over a 90-minute period. The contents are treated as in Example 3 to yield a stable copolymer/polyol dispersion having a Brookfield viscosity (RV viscometer, spindle No. 3, 10 rpm at 25° C.) of 2250 cps.

EXAMPLE 5

An alternate method of preparing the mono-adduct is as follows. Into an apparatus as described in Example 1 is charged 196 g (0.07 mole) of monool, 8.9 g (0.07 mole) of 2-hydroxyethylmethyl methacrylate, 7 g (0.01 mole) of dibutyltindilaurate, and 0.2 g of 2,4,6-tri-t-butylphenol. The mixture is heated to 90° C. and to said mixture is charged 8.9 g (0.07 mole) of oxalyl chloride. The mixture is continued at 90° C. for 2 hours, at which time an additional 2 g of oxalyl chloride is added. The mixture is heated with stirring for an additional hour and stripped for one hour at 15 mm to yield a clear, brown product.

What is claimed is:

1. A stable improved copolymer dispersion which comprises:
   (A) a polyahl having dispersed therein;
   (B) an addition copolymerizate of (1) a monomeric adduct of (a) an active ethylenicallyunsaturated haloglyoxylyl monomer and (b) a monoahl or a polyahl with (2) at least one other ethylenically unsaturated monomer; or
   (C) (1) an addition copolymer of a haloglyoxylyl monomer with at least one other ethylenically unsaturated monomer and (2) a monoahl or polyahl; or
   (D) a mixture of (B) and (C); or
   (E) a mixture of (B) and/or (C) and a polymer of at least one other ethylenically unsaturated monomer.

2. A dispersion of claim 1 wherein the mole ratio of polymerized haloglyoxylyl monomer to monoahl or polyahl is at least about 0.001:1 and less than an amount at which gelation occurs.

3. A dispersion of claim 1 wherein the adduct comprises from about 0.01 to about 50 weight percent of the dispersion.

4. A dispersion of claim 1 wherein the polyahl is a polyether polyol, the monoahl is a polyether monool, the reactive haloglyoxylyl monomer is methacryloxyethylchloroglyoxalate or acryloxyethylchloroglyoxalate and the other ethylenically unsaturated monomer or a mixture of at least two of such other monomers is a monovinylidene aromatic, an ethylenically unsaturated carboxylic acid, an ethylenically unsaturated nitrile, an alkyl ester of an ethylenically unsaturated carboxylic acid, a vinyl halide, a vinylidene halide or a mixture of two or more thereof.

5. A dispersion of claim 1 wherein the mole ratio of polymerized haloglyoxylyl monomer to monoahl or polyahl is in the range from about 0.001:1 to about 0.1:1.

6. A dispersion of claim 1 wherein the mole ratio of polymerized haloglyoxylyl monomer to monoahl or polyahl is in the range from about 0.001:1 to about 0.2:1.

7. A dispersion of claim 1 wherein the other monomer constitutes from about 1 to about 70 weight percent of the dispersion.

8. A dispersion of claim 4 wherein the other monomer or mixture of such other monomers constitutes from about 1 to about 70 weight percent of the dispersion.

9. A dispersion of claim 1 wherein the other monomer consititutes from about a 10 to about 40 weight percent of the dispersion.

10. A dispersion of claim 4 wherein the mixture of such monomers constitutes from about 10 to about 40 weight percent of the dispersion.

11. A dispersion of claim 1 which comprises:
    (A) a polyahl having dispersed therein;
    (B) an addition copolymerizate of (1) a monomeric adduct of (a) an active ethylenically unsaturated chloroglyoxylyl monomer and (b) a monoahl or a polyahl with (2) at least one other ethylenically unsaturated monomer; or
    (C) (1) an addition copolymer of a chloroglyoxylyl monomer with at least one other ethylenically unsaturated monomer and (2) a monoahl or polyahl; or (D) a mixture of (B) and (C); or (E) a mixture of (B) and/or (C) and a polymer of at least one other ethylenically unsaturated monomer;

provided that in the copolymer dispersion the mole ratio of polymerized chloroglyoxylyl monomer to monoahl or polyahl is at least about 0.001:1 and less than an amount at which gelation occurs.

12. A method for making the copolymer dispersion of claim 1 which method comprises:

(A) reacting an active haloglyoxylyl monomer with a monoahl or polyahl to form a monomeric adduct and (B) copolymerizing the adduct with another ethylenically unsaturated monomer or a mixture of at least two of such other monomers in a polyahl liquid medium which medium is a continuous phase.

13. A method for making the copolymer dispersion of claim 1 which method comprises:

(A) copolymerizing an active haloglyoxylyl monomer with another ethylenically unsaturated monomer or a mixture of at least two of such other monomers and (B) reacting the resulting copolymer with a monoahl or polyahl in excess polyahl to form a polymeric adduct of monoahl or polyahl and copolymer dispersed in polyahl.

14. A polyurethane composition prepared by reacting the copolymer dispersion of claim 1 with an organic polyisocyanate.

15. A polyurethane composition of claim 14 in the form of a foam.

* * * * *

UNITED STATES PATENT AND TRADEMARK OFFICE
CERTIFICATE OF CORRECTION

PATENT NO. : 4,493,908

DATED : January 15, 1985

INVENTOR(S) : Thomas E. Fisk

It is certified that error appears in the above—identified patent and that said Letters Patent is hereby corrected as shown below:

In the section entitled "ABSTRACT" (57), line 7, "e,g." should read --e.g.--.

Col. 3, line 65, also Col. 6, lines 10 and 15, the portion of the formula represented by "  " should be represented by -- 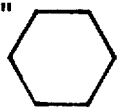 --.

Col. 4, line 44, "portions" should read --portion--; line 66, "X" should read --X"--.

Col. 5, line 9, "Y-(R'''-$_m$R'''-Z]$_x$" should read --Y$+$(R'''A$)_m$R'''-Z]$_x$--; line 32, "about250" should read --about 250$\underline{m}$--.

Col. 6, line 28, "much" should read --such--.

Col. 7, line 54, "αβ-ethylenically" should read --α,β-ethylenically--.

Col. 8, line 29, please delete "of"; line 58, "of" should read --to--.

Col. 9, line 45, "naphthylene-1,51-diisocyanate" should read --naphthylene-1,5-diisocyanate--.

UNITED STATES PATENT AND TRADEMARK OFFICE
CERTIFICATE OF CORRECTION

PATENT NO. : 4,493,908

DATED : January 15, 1985

INVENTOR(S) : Thomas E. Fisk

It is certified that error appears in the above—identified patent and that said Letters Patent is hereby corrected as shown below:

Col. 10, line 54, "acide" should read --acid--.
Col. 11, line 33, "is" in the first instance should read --in--.
Claim 1, line 5, "ethylenicallyunsaturated" should read --ethylenically unsaturated--; Claim 9, line 2, "consititutes from about a 10" should read --constitutes from about 10--.

Signed and Sealed this

Sixteenth Day of July 1985

[SEAL]

Attest:

DONALD J. QUIGG

Attesting Officer

Acting Commissioner of Patents and Trademarks